United States Patent
Schnyder

Patent Number: 5,792,036
Date of Patent: Aug. 11, 1998

[54] ADJUSTABLE DEFLECTION ROLL AND METHOD OF MAKING

[75] Inventor: Eugen Schnyder, Waltenschwil, Switzerland

[73] Assignee: Voith Sulzer Papiermaschinen GmbH, Heidenheim, Germany

[21] Appl. No.: 602,924

[22] Filed: Feb. 16, 1996

[30] Foreign Application Priority Data

Feb. 17, 1995 [DE] Germany ............... 195 05 379.6

[51] Int. Cl.$^6$ ............................... B23P 15/00
[52] U.S. Cl. ............... 492/7; 492/2; 492/20; 29/895.21
[58] Field of Search ............ 492/2, 7, 20; 384/99, 384/100; 100/162; 72/243; 29/895.21, 895.22, 895.2

[56] References Cited

U.S. PATENT DOCUMENTS

| | | | |
|---|---|---|---|
| 4,089,094 | 5/1978 | Kaira | 492/7 |
| 4,414,890 | 11/1983 | Schiel et al. | 492/7 |
| 4,757,582 | 7/1988 | Verka | 492/7 |
| 5,290,223 | 3/1994 | Lehmann | 492/7 |

FOREIGN PATENT DOCUMENTS

28 47 029  11/1980  Germany.

*Primary Examiner*—Irene Cuda
*Attorney, Agent, or Firm*—Darby & Darby

[57] ABSTRACT

An adjustable deflection roll includes a fixed support having a center axial bore. A roll is rotatably mounted about the fixed support. The roll sleeve is supported on support elements. The support elements are actuated by a pressure fluid. The support elements form a plurality of pressure zones. Each of the pressure zones are independently fed with pressure fluid at an independent predetermined pressure by feeder tubes which are disposed in the center axial bore of the fixed support. The feeder tubes are connected to supply lines at one axial end of the fixed support. A plurality of divider walls are disposed in the bore to separate the sections of the bore into the plurality of pressure zones. At least one of the plurality of feeder tubes has an opening in each of the plurality of zones. Each of the plurality of divider walls is formed by at least two disks, which are axially spaced apart at a predetermined distance from each other. The plurality of feeder tubes pass through the at least two disks. The at least two disks fix a position of each of the plurality of feeder tubes. A space disposed between each of the at least two disks is filled, in a pressure-tight manner, with a casting compound.

9 Claims, 1 Drawing Sheet

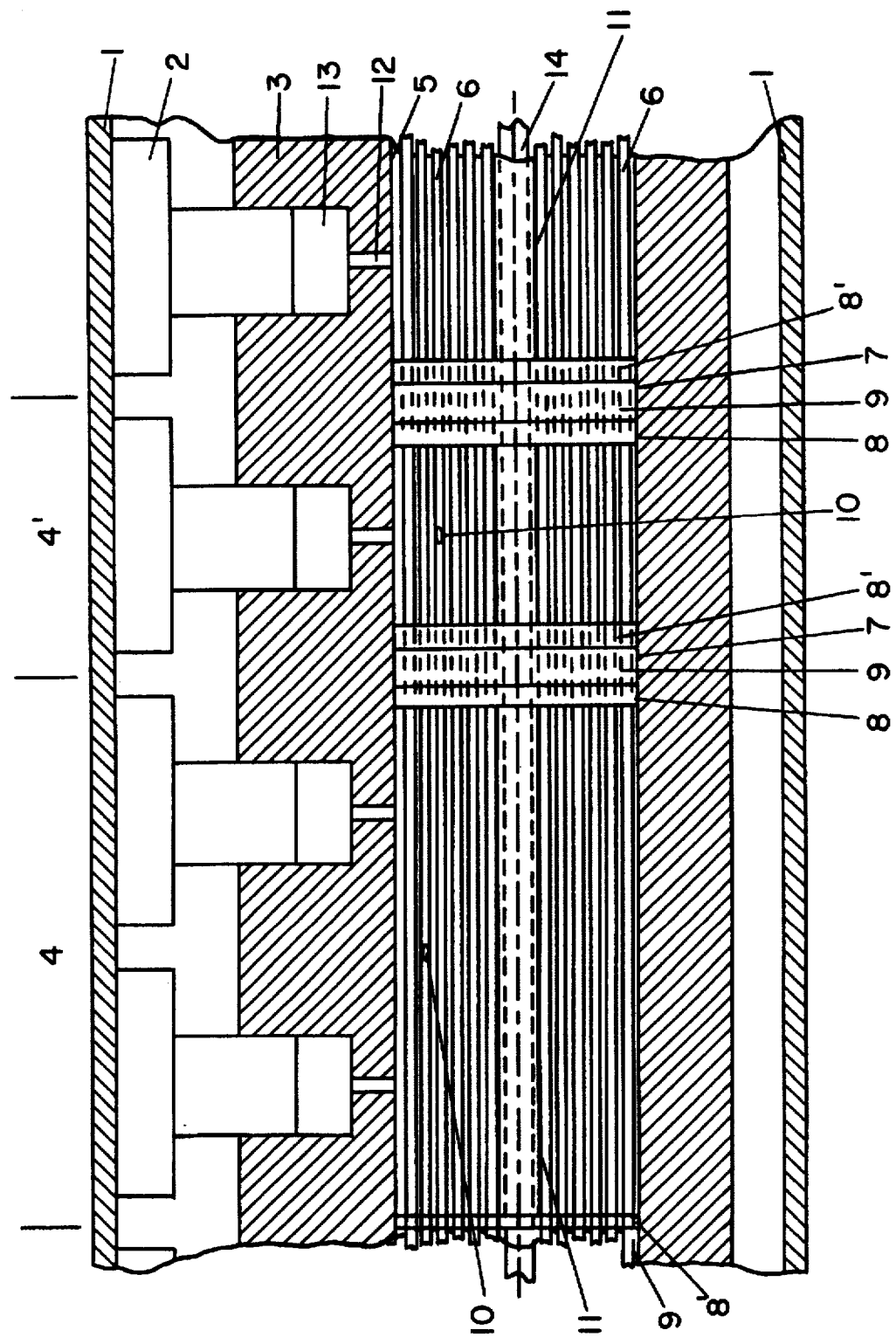

ADJUSTABLE DEFLECTION ROLL AND METHOD OF MAKING

BACKGROUND OF THE INVENTION

1. Field of the Invention

The present invention relates to an adjustable deflection roll. More specifically, the present invention relates to adjustable deflection rolls having a plurality of pressure zones that are each independently maintained at a predetermined pressure.

2. Discussion of the Related Art

Adjustable deflection rolls are conventionally used to manufacture or treat webs of material, such as webs of fibrous material and fabrics.

German Reference No. DE-PS 28 47 029 teaches the use of an adjustable deflection roller having a plurality of pressure zones that are each independently maintained at a predetermined pressure. Fluid is supplied at a predetermined pressure to the support elements of each of the individual pressure zones. The zones are fluidly connected to the supply lines by feeder tubes. The feeder tubes pass through the walls that separate the pressure zones and extend to each of the pressure zones. Each of the feeder tubes are sealed with respect to the dividing wall at each location where the feeder tube passes through the dividing wall. These feeder tube sealing elements require a relatively large amount of space, especially in the radial direction. Thus, the number of feeder tubes that can be fitted and sealed within a dividing wall, as well as the number of pressure zones, are limited. However, to improve product quality in the webs of material, it is preferred to be able to affect the pressure along the adjustable deflection roll with as many independently controlled pressure zones as possible.

It is, therefore, an object of the present invention to increase the number of pressure zones available in an adjustable deflection roll, which pressure zones can be supplied with fluid at independent predetermined pressures.

SUMMARY OF THE INVENTION

In accordance with a preferred embodiment demonstrating further objects, features and advantages of the present invention, an adjustable deflection roll includes each of the dividing walls being formed by at least two disks which are disposed at an axial spaced apart distance with respect to each other. The two disks maintain the radial and angular position of the feeder tubes which extend through them. The space between each of the two disks, which form a dividing wall, is filled, in a pressure-tight manner, with a casting compound. The use of a casting compound, which seals the tubes with respect to the disks, dispenses with the need for the previously used separate feeder tube sealing element. These sealing elements were required to seal each of the feeder tubes with respect to the dividing walls, or more specifically, with respect to the disks. Thus, the present invention permits more radial space to be available in the disks, which space can be used for additional feeder tubes.

To simplify the manufacturing of the adjustable deflection roller according to the present invention, it is preferable that all of the feeder tubes be of the same length and be closed at the axial end that is disposed inside of the support. The feeder tube that is designated for a particular pressure zone has an opening disposed in the corresponding section of the bore of the fixed support. Thus, an of the parts are structurally configured a similar manner, except for the position of the openings in the feeder tubes.

The feeder tube that is designated for the pressure zone that is disposed at the greatest distance from the supply lines can, instead of having an opening, simply be open at the axial end disposed inside the support.

At least one spacer piece is disposed between adjacent divider walls. The spacer piece can be, for example, a sleeve or a flat coil spring element.

At least one tensioning element extends axially through the dividing walls and spacer pieces. The dividing walls that hold the feeder tubes are preferably manufactured (with the feeder tubes) separately before being inserted into the bore of the support. After being inserted into the bore, the dividing walls are radially expanded by applying a tensile force on the disks. The tensile force is exerted on the disks by the tensioning element and is transmitted to the disks by the spacer pieces. Thus, premanufactured feeder tubes and dividing walls can simply be inserted into and removed from the bore in the support. The tension applied by the tensioning element is relaxed to radially reduce the size of the casting compound to permit entry and exit of the feeder tubes and dividing walls into and from the bore. Tension is applied by the tensioning element after the feeder tubes and dividing walls are disposed within the bore to radially increase the size of the casting compound to permit the sealing of the dividing walls with respect to the bore.

In a preferred embodiment a parting agent is applied to the feeder tubes and the tensioning element in the area of the dividing walls before the casting compound is filled so that these parts will move within the casting compound. Movement of these parts is necessary because of the thermally-dependent changes in length and spacing as well as the changes in the spacing between the dividing walls that are brought about by the tensioning element.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

The sole FIGURE shows a partial cross-sectional view of an adjustable deflection roll according to the present invention.

DETAILED DESCRIPTION OF THE PREFERRED EMBODIMENT

Referring now to the drawing FIGURE, an adjustable deflection roll is illustrated. The adjustable deflection roll is comprised of a fixed support 3 and a roll sleeve 1 mounted about support 3. Roll sleeve 1 rotates about support 3. Roll sleeve 1 is supported on a plurality of support elements 2. The amount of support applied by support elements 2 is controlled by a pressure fluid.

A plurality of pressure zones 4 and 4' are disposed axially along the roll and each zone includes one or more support elements 2; it being understood that relative orientation adjectives such as "radial", "axial", etc. are utilized herein to simplify the present description and refer to the adjustable deflection roll and are not intended to limit orientation of the adjustable deflection roll when mounted for use. Pressure fluid can be fed to the pressure zones 4 and 4' at different pressures by means of feeder tubes 6 which are located in a central bore 5 of the support 3 and which are connected at one axial end of the support 3 to supply lines.

To form the pressure zones 4 and 4', the corresponding sections of the bore 5 in the support 3 are separated from each other by divider walls 7. These sections are fluidly connected to a pressure chamber 13 of the corresponding support element 2 by a channel 12.

All of the feeder tubes 6 pass through the divider walls 7 and are of the same axial length. Additionally, all of the feeder tubes 6, with the exception of the feeder tube that corresponds to the pressure zone 4 or 4' that is disposed at the greatest distance from the supply lines, are closed at the axial end which lies inside the support 3. A feeder tube 6 for a corresponding pressure zone has at least one opening 10, which opening is disposed in the corresponding section of bore 5 of support 3. Of course, the feeder tubes 6 can also extend only up to the corresponding section of bore 5 in which the opening is disposed. However, this embodiment results in different configurations of the feeder tubes 6 and divider walls 7. More specifically, the feeder tubes will be of different axial lengths and some divider walls will have more through bores to receive feeder tubes than other divider walls.

The divider walls 7 are each formed by two disks 8 and 8'. The two disks 8, 8' are disposed at an axial spaced apart distance from each other. Each disk 8 and 8' holds and stabilizes the position of the feeder tubes 6 which pass through them. Because the openings in the disks 8 and 8' have enough play for the assembly of the feeder tubes 6, the pressure-tight sealing between the sections of the bore 5 of the support 3 is effected by a casting compound 9, which is introduced into the space between the disks 8 and 8'. Thus, a separate sealing element disposed between each of the feeder tubes 6 and the disks 8 and 8' is not required. Therefore, additional space is available in each disk for additional feeder tubes 6.

To fix the divider walls 7 in position, a spacer piece 11 is disposed between adjacent divider walls. In a preferred embodiment, the spacer piece 11 is a sleeve. However, the spacer piece could also be a spring, such as a flat coil spring. A tensioning element 14 extends axially through the divider walls 7 and the spacer pieces 11.

To manufacture the adjustable deflection roll, the feeder tubes 6, which have been provided with the appropriate openings 10, are passed through the disks 8 and 8'. A spacer piece 11 is placed between adjacent side walls. A tensioning element 14 is placed axially through the plurality of divider walls 7 and through the spacer piece 11. The space between the disks 8 and 8' is then filled with a casting compound which must, of course, be able to bear the pressure differences which may occur between the pressure zones 4 and 4'. Thus, one skilled in the art will appreciate that appropriate casting molds can be used to fill the casting compound. After the hardening of the casting compound has occurred, the bundle of tubes, including the dividing walls 7, spacer pieces 11 and tensioning element 14, can easily be inserted into the bore 5 in the support 3. After the insertion of this bundle of tubes, a tensile force is exerted on the disks 8 and 8' by the tensioning element 14. The tensile force is transmitted by the spacer pieces 11, compressing discs 8, 8', thus causing the casting compound to expand in the radial direction, which causes a sealing of the dividing walls 7 with respect to the bore 5. If the bundle of tubes is to be removed, the tension of the tensioning element 14 is relaxed and because of the appropriate elasticity of the casting compound 9, the casting compound radially decreases in size such that the dividing wall 7 is no longer sealed to bore 5.

Having described the presently preferred exemplary embodiment of an adjustable deflection roll in accordance with the present invention, it is believed that other modifications, variations and changes will be suggested to those skilled in the art in view of the teachings set forth herein. It is, therefore, to be understood that all such modifications, variations, and changes are believed to fall within the scope of the present invention as defined by the appended claims.

What is claimed is:

1. An adjustable deflection roll comprising:

a fixed support having a center axial bore;

a roll sleeve being rotatably mounted about said fixed support, said roll sleeve being supported on support elements, said support elements being actuated by a pressure fluid, said support elements forming a plurality of pressure zones, each of said pressure zones being independently fed with pressure fluid at an independent predetermined pressure by feeder tubes which are disposed in said center axial bore of said fixed support, said feeder tubes being connected to supply lines at one axial end of said fixed support; and a plurality of divider walls being disposed in said bore to separate the sections of the bore into said plurality of pressure zones, at least one of said plurality of feeder tubes having an opening in each of said plurality of zones, each of said plurality of divider walls being formed by at least two disks which are axially spaced apart at a predetermined distance from each other, said plurality of feeder tubes passing through said at least two disks, said at least two disks fixing a position of each of said plurality of feeder tubes, a space disposed between each said at least two disks being filled, in a pressure-tight manner, with a casting compound.

2. The adjustable deflection roll according to claim 1, wherein all of said plurality of feeder tubes are of the same length.

3. The adjustable deflection roll according to claim 1, further comprising at least one spacer piece being disposed between adjacent divider walls.

4. The adjustable deflection roll according to claim 3, wherein said spacer piece is a sleeve that extends in an axial direction.

5. The adjustable deflection roll according to claim 3, wherein said spacer piece is a flat coil spring element that is aligned in an axial direction.

6. The adjustable deflection roll according to claim 3, further comprising at least one tensioning element extending axially through said plurality of divider walls and said at least one spacer piece.

7. A method for manufacturing an adjustable deflection roller comprising the steps of:

mounting a rotatable roll sleeve about a fixed support having a center axial bore;

extending a plurality of feeder tubes through a plurality of divider walls, wherein each of said divider walls is formed from at least two disks that are axially spaced apart at a predetermined distance;

placing a spacer piece between adjacent divider walls;

extending a tensioning element axially through the plurality of divider walls and through said spacer piece; and filling the space between each of said at least two disks, in a pressure-tight manner, with a casting compound.

8. The method according to claim 7, further comprising the step of, inserting the assembled plurality of feeder tubes and plurality of divider walls, including said casting compound, within said center axial bore.

9. The method according to claim 8, further comprising the step of, after the inserting step, radially expanding said plurality of divider walls by applying force on said at least two disks, said force being applied by said tensioning element and being transmitted to said plurality of divider walls by said spacer piece.

* * * * *